United States Patent
Ritter et al.

(10) Patent No.: US 10,747,584 B2
(45) Date of Patent: Aug. 18, 2020

(54) SECURITY-AWARE PARTITIONING OF PROCESSES

(71) Applicant: SAP SE, Walldorf (DE)

(72) Inventors: Daniel Ritter, Heidelberg (DE); Philipp Stefan Womser, Östringen (DE)

(73) Assignee: SAP SE, Walldorf (DE)

( * ) Notice: Subject to any disclaimer, the term of this patent is extended or adjusted under 35 U.S.C. 154(b) by 109 days.

(21) Appl. No.: 15/999,491

(22) Filed: Aug. 20, 2018

(65) Prior Publication Data

US 2020/0057677 A1 Feb. 20, 2020

(51) Int. Cl.
*G06F 9/50* (2006.01)
*G06F 16/901* (2019.01)
*G06Q 30/02* (2012.01)
*H04L 12/24* (2006.01)
*H04L 12/26* (2006.01)

(52) U.S. Cl.
CPC .......... *G06F 9/5077* (2013.01); *G06F 9/5027* (2013.01); *G06F 16/9024* (2019.01); *G06Q 30/0206* (2013.01); *H04L 41/0816* (2013.01); *H04L 41/0893* (2013.01); *H04L 43/045* (2013.01); *H04L 43/08* (2013.01)

(58) Field of Classification Search
CPC ............. H04L 41/0816; H04L 41/0893; H04L 43/045; H04L 43/08; G06F 16/9024; G06F 9/5027; G06Q 30/0206
See application file for complete search history.

(56) References Cited

U.S. PATENT DOCUMENTS

| | | | |
|---|---|---|---|
| 8,543,653 B2 | 9/2013 | Bhatt et al. | |
| 8,655,989 B2 | 2/2014 | Ritter et al. | |
| 8,661,107 B2 | 2/2014 | Hoffmann et al. | |
| 8,739,124 B2 | 5/2014 | Ritter et al. | |
| 8,805,769 B2 | 8/2014 | Ritter et al. | |
| 8,850,005 B2 | 9/2014 | Bhatt et al. | |
| 9,135,604 B2 | 9/2015 | Ritter et al. | |
| 2013/0096967 A1* | 4/2013 | Simitsis ................ | G06Q 10/04 705/7.11 |

(Continued)

OTHER PUBLICATIONS

Extended European Search Report issued in European Application No. 18208290.9 dated Apr. 26, 2019, 7 pages.

*Primary Examiner* — El Hadji M Sall
(74) *Attorney, Agent, or Firm* — Fish & Richardson P.C.

(57) ABSTRACT

Techniques are described for providing security-aware partitioning of processes. An example method includes identifying an integration scenario for optimization in a cloud-based system based on optimization constraints. The identified integration scenario is translated into a directed graph comprising connections between particular flows within the integration scenario. Each flow in the identified scenario is automatically analyzed to determine whether the flow is shareable across processing units associated with a different tenant, and each flow can be annotated in the direct graph with results of the analysis. At least one optimization to the integration scenario is determined based on the annotated directed graph and a set of optimization constraints. An assignment of flows to particular processing units is generated based on the determined at least one optimization.

20 Claims, 7 Drawing Sheets

(56) References Cited

U.S. PATENT DOCUMENTS

2013/0097320 A1* 4/2013 Ritter .................... G06Q 10/06
　　　　　　　　　　　　　　　　　　　　　　　　　　　709/226
2014/0068635 A1　　3/2014　Holzleitner et al.
2018/0176089 A1　　6/2018　Ritter et al.

* cited by examiner

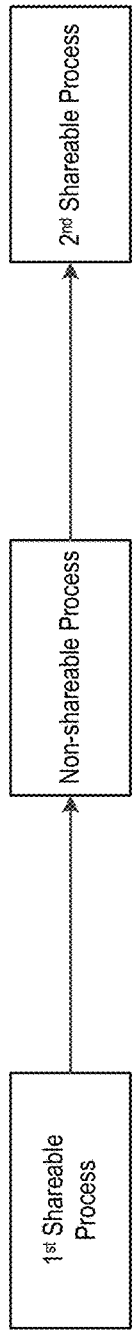
FIG. 2A – Original iFlow before partitioning
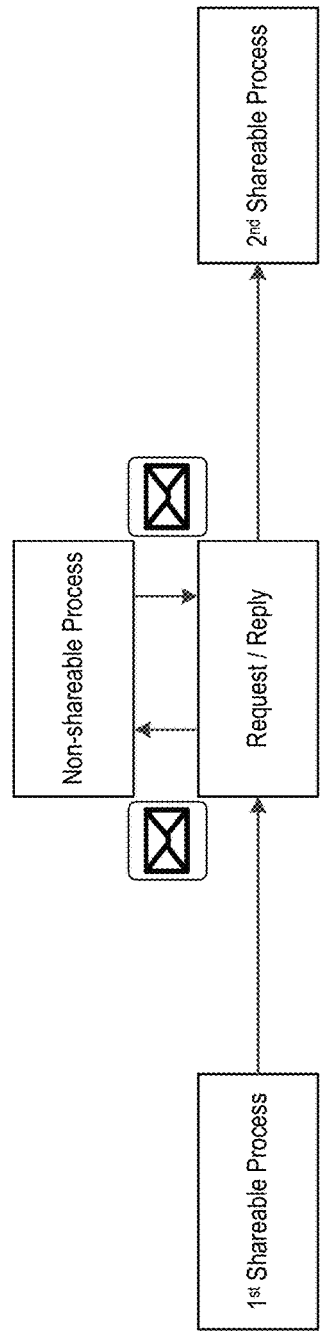
FIG. 2B – Shareable iFlow after partitioning with a call to a non-shareable iFlow
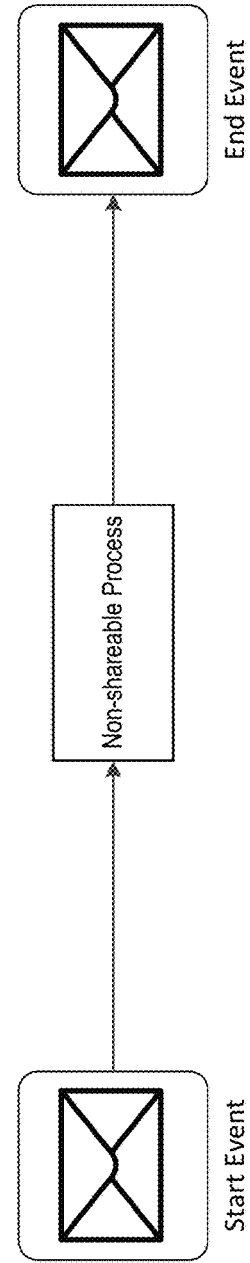
FIG. 2C – Non-Shareable iFlow after Partitioning

SECURITY-AWARE PARTITIONING OF PROCESSES

BACKGROUND

The present disclosure relates to a system and computerized method for providing a security-aware partitioning of processes in cloud computing and other distributed environments.

In some systems, modularization of different types of applications can be performed across one or more processors or processing units. The spread of applications to distributed solutions leads to communication requirements provided, in some instances, by middleware systems (e.g., enterprise application integration, data or event steam processors and pipelines, and more). Single data processors can be organized in a process-like manner (referred to as "processes") that are executed in one or many instances of a middleware system (including micro-services, serverless computing, and other systems).

Vendors of such systems or platforms have an interest in operating these processes at a lowest possible cost while guaranteeing and supporting specific service qualities and respecting all relevant security aspects, such as confidentiality (e.g., a process of customer A is not able to read or change the data processed in the process of customer B). To do so, many current systems separate the processes of different customers/tenants by isolating them in different processing units by tenant (e.g., through runtime containers, virtual machines (VMs), or containers), thereby ensuring that no data is shared across processes of different customers.

SUMMARY

Implementations of the present disclosure are generally directed to providing security-aware partitioning of processes. In one example implementation, a computerized method executed by hardware processors can be performed. The example method can comprise identifying an integration scenario for optimization in a cloud-based system based on one or more optimization constraints, wherein the integration scenario modeled using at least one integration flow. The identified integration scenario can be translated into a directed graph comprising connections between particular flows within the integration scenario. Each flow in the identified scenario is automatically analyzed to determine whether the particular flow is shareable across processing units associated with a different tenant, and each flow of the directed graph can be annotated with results of the analysis as to whether the particular flow is shareable. At least one optimization to the integration scenario is determined based on the annotated directed graph and a set of optimization constraints. An assignment of flows to particular processing units is generated based on the determined at least one optimization.

Implementations can optionally include one or more of the following features. In some instances, at runtime, the method can further comprise reading the generated assignment of flows to particular processing units and deploying the flows to particular processing units based on the generated assignment of flows.

In some instances, the optimization constraints include at least one of a process-based metric, a configuration-based metric, or a cost-based metric.

In some instances, the processing units comprise at least one of virtual machines (VMs) or containers included within one or more VMs.

In some instances, determining the at least one optimization to the integration scenario comprises determining that a particular flow includes a sequence of operations to be performed. A further determination that at least a first portion of the sequence of operations to be performed comprises a non-shareable portion of the sequence of operations and at least a second portion of the sequence of operations to be performed comprises a shareable portion of the sequence of operations can be performed. Then, a graph partitioning operation can be performed on the particular flow to split the directed graph associated with the particular flow into a shareable portion and a non-shareable portion based on the determination, which can include inserting a call from the shareable portion to the non-shareable portion and a call from the non-shareable portion to the shareable portion for execution at runtime. In some of those instances, after performing the graph partitioning operation and prior to generating the assignment of flows to particular processing units, determining the at least one optimization to the integration scenario can further comprise comparing execution parameters associated with the expected execution of the graph partitioned shareable and non-shareable portions of the particular flow to an expected execution of the particular flow. In response to determining from the comparison that the expected execution of the graph partitioned shareable and non-shareable portions of the particular flow improve performance according to the at least one optimization constraints, the method can determine to use the graph partition shareable and non-shareable portions for the particular flow.

In some instances, automatically analyzing each flow in the identified scenario to determine whether the particular flow is shareable across processing units associated with a different tenant comprises identifying an integration pattern type associated with the particular flow and performing an integration pattern type-specific analysis on the particular flow. The process can then determine whether the particular flow is shareable across processing units associated with a different tenant based on the integration pattern-specific analysis. In some instances, the integration pattern type-specific analysis on the particular flow comprises a white-list based analysis of particular integration pattern types.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed by at least one processor, cause the at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 2A-C illustrate example results of a particular graph partitioning process for a set of shareable and non-shareable processes.

DETAILED DESCRIPTION

The present disclosure describes systems and methods for security-aware partitioning of processes. Today's business applications are highly modularized, and thus require communication using integration scenarios, which are currently executed on Enterprise Application Integration (EAI) systems. These systems are based on a collection of Enterprise Integration Patterns (EIP), which denote the building blocks of the systems and the integration scenarios (e.g., content-based routing, message transformation, message signing, splitting and aggregation). With the rise of cloud computing, the EAI systems are usually managed on multi-tenant cloud integration platforms (e.g., SAP's Cloud Platform Integration (CPI)). However, the current solutions face difficulties when it comes to cost-efficiently running integration scenarios (called integration flows, iFlows, or simply flows) from different customers (called tenants). Such solutions come at a non-cost optimal, hosting-like solution, which is not preferable in distributed or cloud computing environments. Integration scenarios can only be shared with other tenants if all their patterns are side-effect free. This trade-off between cost and level of security (that is, scenarios can only be shared if they do not have side-effects) has also been identified in related domains (e.g., cloud database management).

Figure 1:
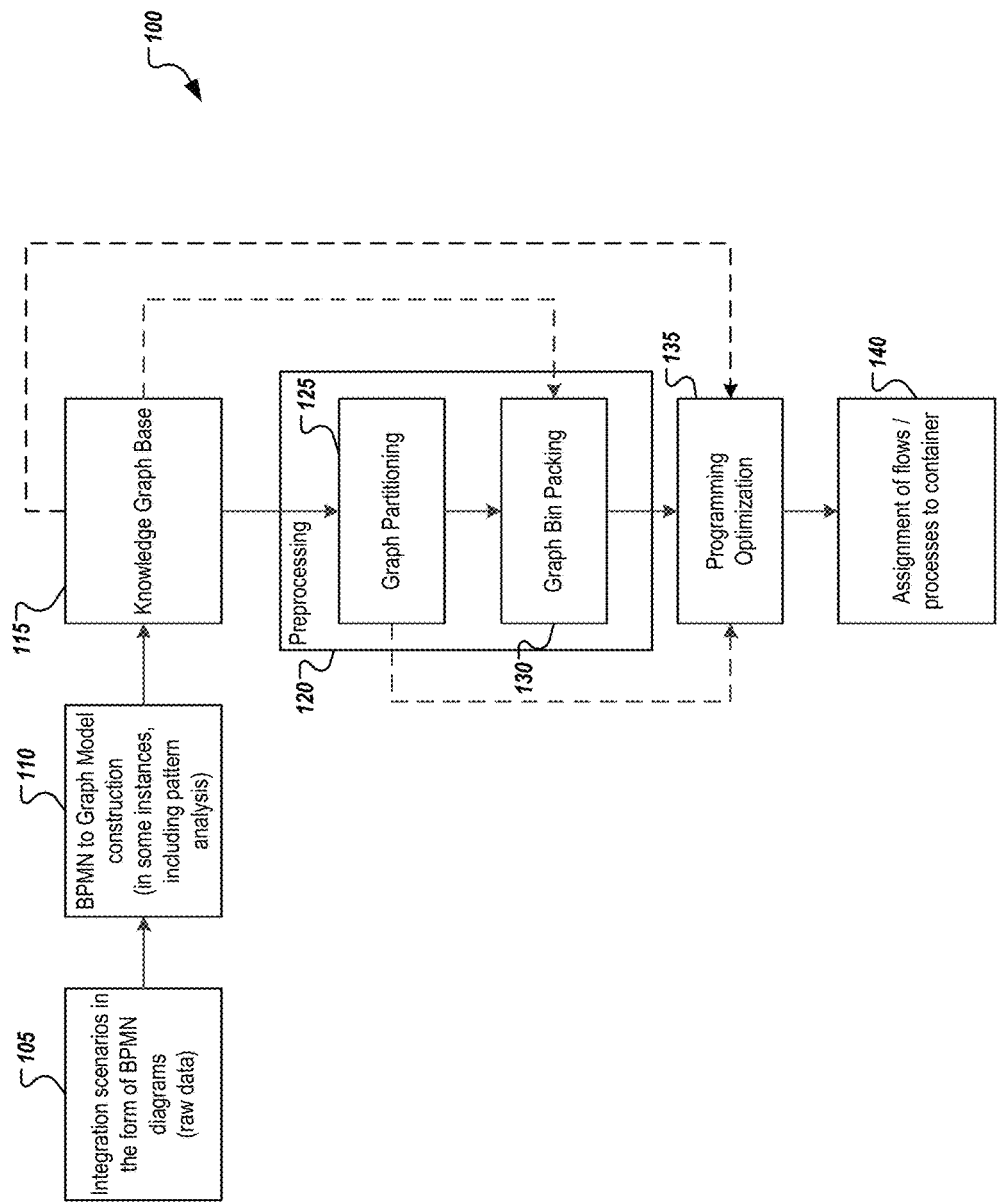
FIG. 1 illustrates an example process for security-aware flow sharing in one example implementation.

FIG. 1 provides an example a current approach as to how integration flows are hosted in some solutions. As illustrated, each tenant can be associated with its own VM where those respective flows are hosted. While providing a highest level of security in that no data is shared across tenants, the approach can, in some instances, represent a significantly inefficiency in resource utilization, as some VMs could potentially be idling often if one tenant only uses one small integration scenario. Furthermore, VM instances may use considerable more overhead as compared to containers. Therefore, an alternate solution may be to use containers instead of VMs to account for such overhead. In one extreme, every flow could be given its own container providing maximum isolation, as every flow runs in its own separate environment. Even where those containers are executed in the same VM, the isolation and data security can be maintained. However, with respect to cost inefficiency, this solution may still result in significant inefficiencies in instances where one flow is not used often, but must be maintained. In some enterprise solutions, a number of potential flows may be up to and exceed 90,000 flows. If every flow is provided its own container, then costs may be unbearable in many instances. Based on a combination of flows, in some instances, as many as 300,000 containers may be used in those systems. New flows continue to be added, again stressing the ability of systems to dedicate individual containers or VMs to a single flow.

In some instances, one or more of the processes in a particular flow, or a particular flow among a plurality of flows, may be shareable with multiple tenants if, after an analysis of said flow or processes, it is determined that the processes or flow is side-effect free, such that it can be guaranteed that those processes cannot access or influence other processes on the shared processing unit. By combining flows or processes into existing containers, significant levels of cost and processing requirement savings can be realized. In such instances, only shareable flows from different customers can be combined, while non-shareable flows can be isolated as appropriate to avoid potential security issues. The decision as to whether a particular process is shareable or non-shareable can be determined in various manners. Examples are provided herein to illustrate how the processes are evaluated to determine whether they are shareable or non-shareable.

A standard content program may include a sequence of operators to be performed. For the sake of discussion, consider that a particular flow is not shareable based on a particular script to be executed within the sequence. Scripts may allow systems to do many things, such as insert a program that modifies the other programs and flows. As such, the risk of the change may mean that that portion is not shareable. Previously because of this script, the whole process may be determined not to be shareable. In the present solution, the entire sequence can be automatically analyzed to determine, prior to deployment of the operations, whether a particular program is, or portions of the program are, shareable or not. In some instances, the determination may be binary, where a decision is made as to whether the program is shareable or not based on it including a script or other specific portion that is determined not to be shareable. In other instances, however, where an overall program is determined to be non-shareable, an analysis can be performed to determine whether a portion of the program may be shareable other than the portion deemed to be non-shareable. For example, the program may be graphed, and an analysis performed to determine whether the non-shareable portions can be removed from the overall program. If only a script is the problem, the script can be moved away from rest of the program and executed on its own container or VM to ensure that the script does not impact other programs or flows of other tenants. When such a determination is made, the remaining portion of the operators or program may, if needed, be combined on to another tenant's VM or container, as those portions are deemed shareable. In those instances, VMs or containers can be filled or provided a full set of shareable flows to ensure that inefficiencies are better managed, and that totally isolated operations are limited to those operators, flows, or combination of processes and/or flows which are truly non-shareable.

In some instances, separating a particular flow into shareable and non-shareable parts may include a requirement to add a receiver and/or a sender component to the different flows, allowing inputs and outputs to flow between the parts. In such instances, any costs and latency associate with such communications can be considered in the optimization algorithm. The costs can include a communication time, a cost of the communications, or any other suitable consideration related to the interactions between parts and to the costs of modifying the components. To perform a smart or intelligent distribution of the shareable and non-shareable components, one or more service requirements or service requirements, which can be configurable, can be considered. If a latency bound would be violated or exceeded due to a separation, then the system may elect not to split the shareable and non-shareable parts of the flows. In some instances, the service requirements can include or be used to weigh the different optimization goals and provide a smart split of the portions.

In one solution, different operators or elements within an integration flow can be known and used as an initial determination of whether a particular flow is shareable or not shareable. Common integration pattern types can include a number of operators and actions, and may include, but are not limited to, end events, enrichers, start events, mappings, scripts, request replies, end point senders, exclusive gateways, and custom adapters, among others. Using existing knowledge of these patterns, a first level analysis can be performed. For example, end events, enrichers, start events, request replies, endpoint senders, and exclusive gateways may be known as shareable patterns. Those components may be considered as always shareable, such that flows including only these integration patterns may be considered shareable. Additionally, mappings and scripts may be shareable in some circumstances. Mappings represent patterns design to translate messages from one data format to another data format. In some instances, the mapping may be necessary due to different systems having different formats for their data, but which still need to communicate. Scripts represent tools for implementing missing features that are not provided by the other patterns. Scripts provide the possibility to write customized business logic with the help of a particular programming language or combinations of languages. When the system determines that a particular flow includes a mapping or a script, additional analysis of the particular operations performed by the mapping or script, can be performed.

Once the patterns have been analyzed, an annotated graph can be obtained and used to evaluate and perform further optimizations. The annotated graph can include a property graph including a set of vertexes (or nodes) and a set of edges connecting two vertexes (or nodes). An edge can be directed, meaning that it can only be traversed in one direction, whereas undirected edges can be traversed in both direction. The graph may be special graph variant where nodes and edges can have a variable amount of key value pairs called properties. Integration flows can be represented as a directed property graph, wherein every node represents an integration pattern and the edges between the nodes represent the sequence flows. The nodes contain information about the pattern type and additional information based on the type. By representing the integration flows in this manner, the flows can be used in combination with graph algorithms to traverse and work with the graph. As noted, once the graph is generated, each node may be annotated or otherwise associated with a property or other indication representing whether the node is shareable or non-shareable, which can be used to perform further optimizations. The annotated graph, for example, can identify the particular integration patterns as shareable or non-shareable based on the analysis described above.

Once the annotated graph is available, additional preprocessing may be performed prior to calculating and performing the optimizations, in some instances. In one instances, graph partitioning can be used to split non-shareable graphs into multiple graphs that rely on one another. In some instances, the integration patterns for a specific integration flow may include, for example, a first shareable portion, which connects to a second non-shareable portion, which then connects to a third shareable portion. The order here is an example, and is not meant to be limiting. To split the portions in the graph partitioning, the second non-shareable portion can be created as a new, non-shareable flow (or, alternatively, the first and third shareable portions can be created a new, shareable flow). At the location within the original where the second non-shareable portion exists, a new communication connection between the shareable flow including the first and third portions can connect to the new, non-shareable flow. When executed, for instance, the first shareable portion may be performed, and a request/reply action can communicate required information to the new, non-shareable flow. The new, non-shareable flow can execute its operations, and provide its output back to the shareable flow, where the third, shareable portion is executed. In general, after the partitioning operations are performed, the system is provided with multiple non-shareable graphs which are smaller than the original graph and a shareable one which will call the other non-shareable graphs.

By performing the graph partitioning, the system can achieve better results when trying to fit shareable portions into a suitable container in later operations. In some instances, however, the required communication between the shareable and non-shareable flows may result in increased latency when processing messages, as a call to another flow has to be done for every non-shareable flow. In the worst case, a call to another data center or other remote system may be performed, which could require significantly increased latency. In optimizing the graphs constructed from the flow representations, the latency may be considered during the optimization process, specifically when one or more latency or speed requirements for particular tenants or customers are affected by such communications. The optimizations can be performed on the generated graph model. The processes to which the various parts of the graph model are associated can be used at runtime based on the optimized graphs.

A second preprocessing operation, bin packing, can be performed after the graph partitioning. Alternatively, bin packing can be performed without graph partitioning, or may not be performed at all. Bin packing is a method that answers the question on how to most efficiently distribute a set of elements of a certain size to a set of bins with another size that is able to carry one or more of these elements. In the present illustration, the elements are the iFlows or sub-flows of one IFlow and the bins are the runtime container variants of the platform vendors (e.g. Platform of a Service vendors). However, normal bin-packing is not sufficient in the present solution (i.e., no single bin-packing approach suffices for our requirements). For that reason, an alternative solution described herein can be applied. The standard bin-packing is only used to guess some non-optimal upper bounds for some parameters to limit the search space. Now, by performing a bin packing algorithm, the described system obtains a number of bins needed to assign every iflow. This number serves as an upper bound for the optimization. This number may not necessarily contribute to solution quality, but can be used to speed up the optimization process by providing some boundaries to the considerations the optimization process uses.

Once the preprocessing operations are complete, or after one or neither of the preprocessing operations are complete, one or more optimization operations can be performed. The optimization operations can perform, based on any of the preprocessing operations and the analyzed information about the various process parts, a cost analysis to determine improvements in processing and/or costs associated with the operations, based on one or more of optimization rules, required service levels for the associated customer, and other factors. The optimization process and the cost model can evaluate the required capacity of the processes (e.g., based on CPU, network, memory, and disk) and costs in terms of runtime costs such as processing and network latency and message throughput. The cost model can allow for various optimization goals, including maximizing cost savings for a cloud process content provider, sharing processes per container variant and vendor (e.g., either in multi-cloud or inter-cloud manners), separately securing shareable and non-shareable processes via containers, determining different levels of shareability, minimizing latency for non-shareable processes (e.g., based on a level of "stickiness" to one preferred container variant and/or vendor), separating different customer processes (e.g., tenant separation), and limiting container variants to a particular list of vendors, among others. In general, the optimization operations can determine, based on the available information and any user-configurable settings, the best option or options for grouping shareable and non-shareable processes into different containers. Once the determination is made as to how the processes are to be split, moved, or otherwise grouped, the particular processes or flows are assigned to their particular containers FIG. 1 provides an example illustration of an example visualization of one implementation of the described solution. Alternative and additional operations can be used in other instances, and will be understood by persons of skill in the art.

As illustrated at 105, an integration scenario in the form of a BPMN (Business Process Modeling Notation) diagram comprises an input to the analysis. Alternative models can be used in other implementations, and the BPMN diagram is only mean to be an example. The desired result of the analysis is an assignment of flows or processes to a set of containers. Each process x will be assigned to exactly one container y, meaning that a function f(x) is represented where f(x)=$y_x$, where $y_x$ is the container to which flow x is assigned to. As illustrated in diagram 100, the dotted lines represent possible other routes through the algorithm. Those routes may, in some instances, decrease the quality or performance of the algorithm, but are valid routes that may be used for time- or resource-related reasons.

At 110, the BPMN diagram is used to construct a graph model to be used in analyzing the integration scenario. In some instances, the model could be a circular single input, multiple output (SIMO) property graph with one-to-one, one-to-many and many-to-one branching nodes (e.g., multicast, joins, content-based routing). Each node and each edge of the graph model can have several properties assigned (e.g., node is shareable, required capacity of the node), which are used as data input for the described method. The graph model may be a directed graph of the integration processes, and can illustrate the various processes that occur when the integration scenario is executed.

At 115, the graph model or directed graph can be placed into a knowledge graph base. To do so, an analysis of the directed graph can be performed, where the results classify the various components into particular types of processes. The knowledge base graph can, for example, identify which of the particular processes or flows in the integration scenario are shareable or are not shareable. The process to determine that may be based on pattern analysis of the particular processes or flows. First, the type of process or flow can be determined. Based on knowledge of the particular processes or flows over time, certain types of processes and flows may be known as shareable or non-shareable. In some instances, additional analysis of the particulars of a particular process or flow may be considered before a determination of whether the process or flow is shareable.

In one example, each type of process or flow may be identified as shareable, non-shareable, or possibly shareable based on the type of process or flow alone. The determination may be made, for example, based on an existing analysis of the side effects or potential risks of security issues should particular processes or flows be shared. In some events, a white list or black list of patterns or types can be generated. For example, example shareable types may include EndEvents, Enrichers, StartEvents, Request-Reply's, EndpointSender, ExclusiveGateway, and others. Non-shareable types may include custom adapters, as well as others. Potentially or possibly shareable types can include mappings and scripts. The pattern analysis performed can first identify the type or pattern of the process or flow, and can then identify whether that type is shareable. If the result is a potentially shareable pattern, then an additional analysis may be performed to determine whether this instance of the process or flow is shareable or not, or, in some instances, partly shareable. Mappings and scripts are described above, and an analysis as it relates to scripts can be found below related to FIG. 7.

Once the knowledge graph base 115 is generated, various paths can be taken to continue the process. In some instances, the operations may follow into at least one of various preprocessing operations 120, including a graph partitioning operation 125 and a graph bin packing operation 130. In some instances, as shown by the dotted lines, the process may move from 115 directly to 130 (skipping a graph partitioning), from 115 to 135 (skipping all preprocessing), or from the graph partitioning 125 to programming optimization 135 (skipping the graph bin packing 130). Other various alternative paths and operation may be used in other instances.

The preprocessing operations 120 may include, for example, graph partitioning 125 and graph bin packing 130, among others. These operations are described above, and can also include additional or alternative operations. The graph partitioning operation 125 can include attempts to split non-shareable graphs into multiple graphs that rely on each other. After the splitting, multiple non-shareable graphs which are smaller than the original graph and a shareable one that calls the other graphs can be generated. The following represents one example algorithm for performing the graph partitioning:

```
GraphList : cutGraph (Graph : graphToBeCut )
    if graph.notSharablePatternCount > graph.size / 2 ||
        graph.notSharablePatternCount = 0
        return graphToBeCut
    NodeSet : alreadyHandledNodes
    GraphList : graphsAfterCut
    for all node in nodes
        if !alreadyHandledNodes.contains (node)
            if node.isNotSharable
                graphsAfterCut. add
(cutNodes(graphToBeCut , getChain (node)))
    return graphsAfterCut
```

-continued

```
NodeList : getChain (Node:node,
NodeSet:alreadyHandledNodes)
    NodeList : nodesToBeCut
        nodesToBeCut.add(goForward(node, alreadyHandledNodes,
    newNodeList, newNodeList , 3))
        nodesToBeCut .add (goBackwards(node,
    alreadyHandledNodes, newNodeList, newNodeList, 3))
    NodeList : goForward (Node : node , NodeSet :
    alreadyHandledNodes , NodeList : nodeBuffer, NodeList :
    nodesToBeCut , int count )
        if node.hasNotExactlyOneFollower ( )
            alreadyHandledNodes.contains (follower)
            return nodesToBeCut
        else
            nodeBuffer.add (follower)
            alreadyHandledNode.add (follower)
            if follower.isNotSharable( ) || follower.isEnd( )
                nodesToBeCut.addAll(nodeBuffer)
                count ← 3
            count ← count – 1;
            if count > 0
                goForward (follower, nodeBuffer, nodes,
    count)
    Graph : cutNodes (Graph : graphToBeCut , NodeList :
    nodesToBeCut )
        Graph : newGraph
        for node in nodesToBeCut
            graphToBeCut.remove(node)
            newGraph.add(node)
        newGraph.addStart( )
    newGraph.addEnd( )
    graphToBeCut.addCall( )
```

Initially, it is determined that flows that do not contain non-shareable patterns or are made of mostly non-shareable patterns should not be cut. Then, every node in the graph is checked if it is a non-shareable pattern and not already handled. The process would then try to find a possible chain of non-shareable patterns and cut those non-shareable patterns out. The chain the process tries to find is a line of patterns where at least every third pattern is non-shareable and begins and ends with a non-shareable one. In this implementation, designers have chosen every third pattern due to the fact that three additional nodes are needed to be added when the graph is cut (i.e., a start and end node of the new graph and a call to the new graph in the old one). The goBackwards method is the same as the goForward method, except that the process checks checking for the predecessor instead of the follower.

The time complexity of this algorithm is O(n). With the help of the alreadyHandledNodeList, the process ensures that every node in the graph is cut only once. In the chain method every node can only be visited twice. By doing this, the process hopes to achieve better results when trying to fit the patterns and flows onto the container in later steps. This however will increase the latency of the flow when processing messages, as a call to another flow has to be done for every non-shareable flow. In the worst case scenario, a call to another data center or remote system has to be made which would potentially increase latency significantly. Therefore, a stickiness factor can be add for these flows in later steps, leading to them being placed and executed on the same host and data center, where possible. In some implementations, apart from this, latency costs will not be regarded in further steps as they do not represent direct costs for the vendor.

FIGS. 2A-C illustrate an example graph partitioning process. As illustrated in FIG. 2A, an original flow can include a first shareable process, followed by a non-shareable process, following by second shareable process. The determinations as to what is shareable or non-shareable can be made during the operations of generating the knowledge base graph 115.

Based on these determinations, the original flow can be separated into the flows of FIGS. 2B and 2C. In FIG. 2B, the non-shareable process in the illustrated shareable flow is replaced by a request/reply operation which can communicate with the non-shareable process. While the non-shareable flow is illustrated in FIG. 2B, the non-shareable process can be placed into a separate container after the later assignment. The request/reply operation can manage the sending of information needed by the non-shareable process to the non-shareable process. The request/reply operation can then receive any responsive information from the non-shareable process and provide that information to the second shareable process for further operations.

FIG. 2C illustrates the non-shareable flow after separation from the original flow. In particular, the non-shareable process is associated with a start event where input from the first shareable process is received (via the request/reply operation), and an end event to which any output of the non-shareable process is provided. The end event can send the output or control back to the request/reply operation of the shareable flow. The illustration illustrates a single non-shareable process in the original flow. However, alternative implementations and situations may include a plurality of non-shareable processes, and can perform a similar partitioning process for each of the processes.

One the graph partitioning operations 125 are complete, the process 100 can continue to graph bin packing 130 in some implementations. The bin packing process can perform, in some instances, the following operations, although others can be used, substituted, or added to the process in various implementations. A capacity value for every graph, either by estimations with regards to the elements used in the graph and the size of the whole graph or by using prerecorded data on the resource utilization of the process (e.g., by benchmarks or data from the runtime systems), can be calculated. Other suitable means of capacity calculation are possible. Afterwards, every graph is put in a list which is then sorted according to their capacity. Then this list is iteratively processed and every graph is assigned to the first bin it fits without violating capacity or security constraints. If no such bin is found, a new bin will be created and the graph will be assigned to it. This process can then be performed for as long as flows are unassigned. While this method is not yet optimal, it can provide a first estimate on the number of containers required. This estimate denotes an upper bound for the number of containers, which reduces the search space for the optimal solution.

Once the graph bin packing process is completed, process 100 continues to programming optimization operations 135. The optimization operations 135 can include determining, based on multiple factors, the relative efficiency of various operations to be performed. In some instances, a mixed linear programming approach can be used to model a cost function. The optimization can consider that every flow can physically only be in one container at a time. Various cost models and constraint considerations can be used to perform the optimization. In some instances, the variables that may be considered can include, but are not limited to, the following: an amount of iFlows, an amount of containers provided for solving, a Boolean indication if a particular flow is in a particular container, a required capacity for a flow, a capacity of a particular container, costs associated with a particular container, a capacity of a flow for a particular container, a maximum required capacity for a flow, a max cost of a container variant, a maximum amount of flows in one container, a particular tenant associated with a flow, flows with particular side effects in a container, containers of different variant types, capacity of a particular container variant, a cost of a particular container variant, an amount of flows in a particular container, a cost of a container if used based on a potential assignment, the provider of a particular variant and/or container, and a provider of a particular flow, among other considerations.

In some instances, to calculate the used capacity for a particular container, an analysis is performed to determine how much capacity is needed by different flows. The combined needed capacity of all flows in a particular container must be lower than the capacity of the particular container itself. As security is a primary concern, a model needs to be generated such that no flows with possible side effects are in containers with a flow from another tenant or customer. Further, a determination is needed as to which container variants are used by the containers, and to make sure that every container is assigned to exactly one variant. In some instances, the optimization operations 135 ensure that according to the chosen variant of the container, the capacity and costs of the particular container are set correctly. Based on this, an analysis can be performed to generate an estimate as to whether a particular container will contain any flows. A cost of the particular container can then be generated if it may be used. Costs for particular containers can be generated, and an overall estimated costs may be determined for various scenarios based on the potential splits of the iFlows and processes between containers. The total costs for a particular vendor can be optimized, and one or more potential solutions can be returned.

Once an optimized or best solution is generated, a determined assignment of flows and processes to particular containers can be determined at operation 140, and the particular flows and processes can be placed into the corresponding containers, allowing the operations and flows to be executed.

Figure 3:
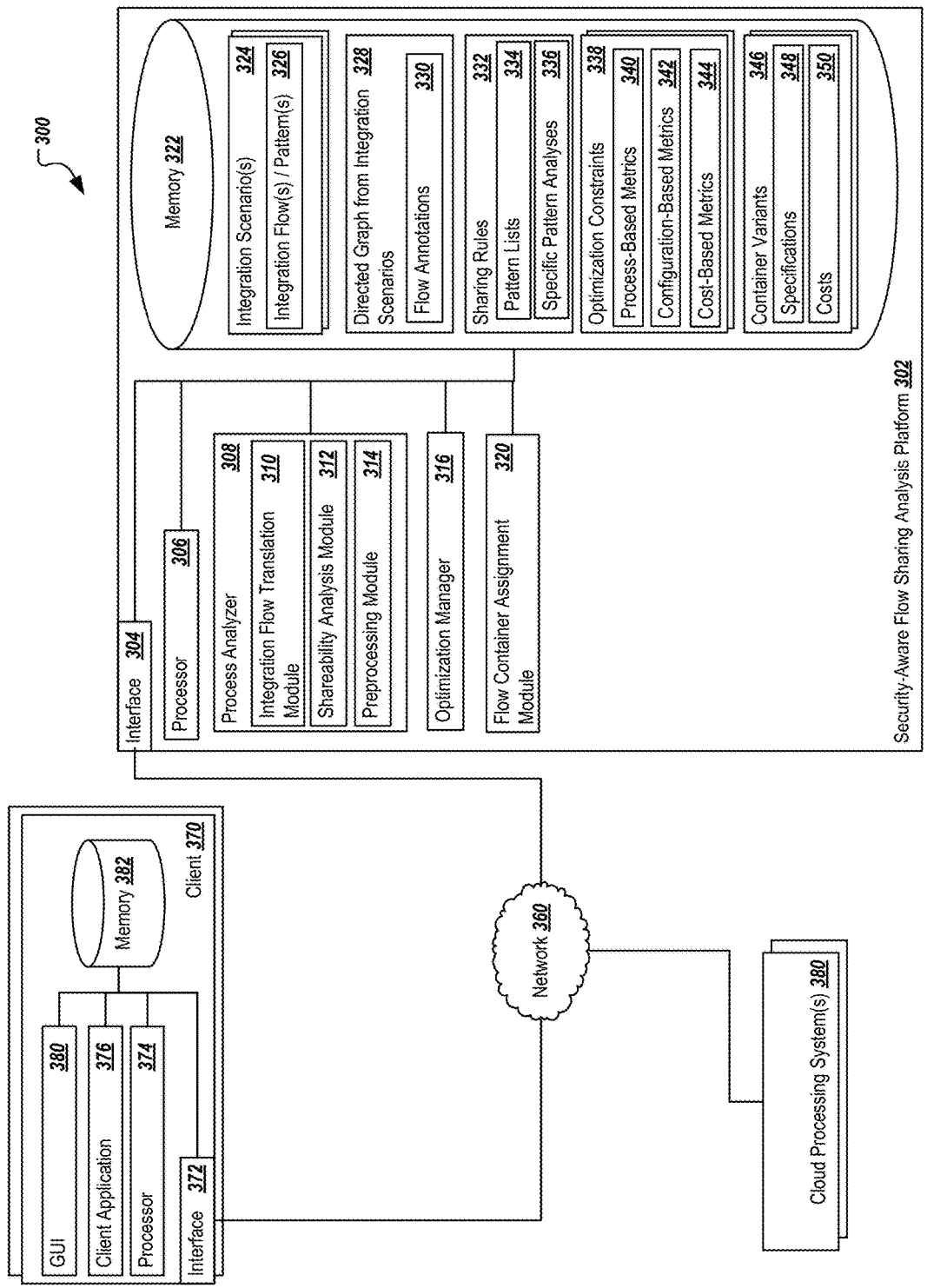
FIG. 3 is a block diagram illustrating an example system for implementing the processes related to providing a security-aware sharing of integration scenarios between containers.

FIG. 3 is a block diagram illustrating an example system 300 for implementing the processes related to providing a security-aware sharing of integration scenarios between containers. As illustrated in FIG. 3, system 300 is associated with a system for analyzing flows and processes in a distributed solution system, where multiple tenants and customers are interacting. The system 300 identifies existing integration scenarios 324 associated with various processes and flows 326, where at least some of the scenarios 324 are associated with different tenants or customers in a multi-tenant or virtualized system. The goal of the architecture described herein is to identify whether one or more of the processes or flows can be sharable with other tenants, so that processes running in the shared system 300 can avoid allowing access to or influence upon other processes executing in the same container or unit of operation. For processes and flows that may be shareable, those items can be shared in execution units between two or more tenants or customers to ensure security while maximizing or improving the cost-efficiency of operation assignments within containers.

In general, the system 300 allows the illustrated components to share and communicate information across devices and systems (e.g., security-aware flow sharing analysis platform 302, client 370, one or more cloud processing systems 380, among others, via network 360). As described herein, the security-aware flow sharing analysis platform 302 may be cloud-based component or system, while in other instances, non-cloud systems may be used. In some instances, non-cloud-based systems, such as on-premise systems, may use or adapt the processes described herein. Additionally, the security-aware flow sharing analysis platform 302 may be part of or associated with one or more of the cloud processing systems 380. Although components are shown individually, in some implementations, functionality of two or more components, systems, or servers may be provided by a single component, system, or server.

As used in the present disclosure, the term "computer" is intended to encompass any suitable processing device. For example, security-aware flow sharing analysis platform 302 and client 370 may be any computer or processing device such as, for example, a blade server, general-purpose personal computer (PC), Mac®, workstation, UNIX-based workstation, or any other suitable device. Moreover, although FIG. 3 illustrates a single security-aware flow sharing analysis platform 302, the system 302 can be implemented using a single system or more than those illustrated, as well as computers other than servers, including a server pool. In other words, the present disclosure contemplates computers other than general purpose computers, as well as computers without conventional operating systems. Similarly, the client 370 may be any system which can request data and/or interact with the security-aware flow sharing analysis platform 302. The client device 370, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others. The client 370 may include one or more specific applications executing on the client 370, or the client 370 may include one or more Web browsers or web applications that can interact with particular applications executing remotely from the client 370.

The security-aware flow sharing analysis platform 302 may be associated with the one or more cloud-based applications or platforms, and may be associated with or a part of a cloud platform such as SAP's Cloud Platform or Cloud Application Studio. As illustrated, the security-aware flow sharing analysis platform 302 includes or is associated with interface 304, processor(s) 306, process analyzer 308, optimization manager 316, flow container assignment module 320, and memory 322. The interface 304 is used by the security-aware flow sharing analysis platform 302 for communicating with other systems in a distributed environment—including within the environment 300—connected to the network 360, e.g., client 370, the cloud processing system(s) 380, other cloud systems, on-premise systems, data sources, and others as well as other systems communicably coupled to the illustrated security-aware flow sharing analysis platform 302 and/or network 360. Generally, the interface 304 comprises logic encoded in software and/or hardware in a suitable combination and operable to communicate with the network 360 and other components. More specifically, the interface 304 may comprise software supporting one or more communication protocols associated with communications such that the network 360 and/or interface's hardware is operable to communicate physical signals within and outside of the illustrated environment 300. Still further, the interface 304 may allow the security-aware flow sharing analysis platform 302 to communicate with the client 370 in response to specific requests to analyze and/or optimize particular integration scenarios 324, as well as with the cloud processing systems 380 when identifying particular containers and units of operations in which the integration flow operations and processes are to be executed, as described herein.

Network 360 facilitates wireless or wireline communications between the components of the environment 300 (e.g., between the security-aware flow sharing analysis platform 302, the client(s) 370, and the cloud processing systems 380), as well as with any other local or remote computer, such as additional mobile devices, clients (e.g., client 370), servers, or other devices communicably coupled to network 360, including those not illustrated in FIG. 3. In the illustrated environment, the network 360 is depicted as a single network, but may be comprised of more than one network without departing from the scope of this disclosure, so long as at least a portion of the network 360 may facilitate communications between senders and recipients. In some instances, one or more of the illustrated components (e.g., the security-aware flow sharing analysis platform 302 and/or the cloud processing systems 380) may be included within network 360 or a portion thereof as one or more cloud-based services or operations, including those associated with a cloud platform. The network 360 may be all or a portion of an enterprise or secured network, while in another instance, at least a portion of the network 360 may represent a connection to the Internet. In some instances, a portion of the network 360 may be a virtual private network (VPN). Further, all or a portion of the network 360 can comprise either a wireline or wireless link. Example wireless links may include 802.11a/b/g/n/ac, 802.20, WiMax, LTE, and/or any other appropriate wireless link. In other words, the network 360 encompasses any internal or external network, networks, sub-network, or combination thereof operable to facilitate communications between various computing components inside and outside the illustrated environment 300. The network 360 may communicate, for example, Internet Protocol (IP) packets, Frame Relay frames, Asynchronous Transfer Mode (ATM) cells, voice, video, data, and other suitable information between network addresses. The network 360 may also include one or more local area networks (LANs), radio access networks (RANs), metropolitan area networks (MANs), wide area networks (WANs), all or a portion of the Internet, and/or any other communication system or systems at one or more locations.

The security-aware flow sharing analysis platform 302 also includes one or more processors 306. Although illustrated as a single processor 306 in FIG. 3, multiple processors may be used according to particular needs, desires, or particular implementations of the environment 300. Each processor 306 may be a central processing unit (CPU), an application specific integrated circuit (ASIC), a field-programmable gate array (FPGA), or another suitable component. Generally, the processor 306 executes instructions and manipulates data to perform the operations of the security-aware flow sharing analysis platform 302. Specifically, the processor 306 executes the algorithms and operations described in the illustrated figures, as well as the various software modules and functionality, including the functionality for sending communications to and receiving transmissions from clients 370, as well as to other devices and systems. Each processor 306 may have a single or multiple core, with each core available to host and execute an individual processing thread. Further, the number of, types of, and particular processors 306 used to execute the operations described herein may be dynamically determined based on a number of requests, interactions, and operations associated with the security-aware flow sharing analysis platform 302. Still further, one or more of the processors 306 may be used to execute particular containers based on the assignments of particular flows and/or processes, including one or more remote processors 306, including those associated with or located at one or more of the cloud processing systems 380.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The security-aware flow sharing analysis platform 302 can include, among other components, several applications, entities, programs, agents, or other software or similar component capable of performing the operations described herein. As illustrated, the security-aware flow sharing analysis platform 302 includes a process analyzer 308, an optimization manager 316, and a flow container assignment module 320. These components combine to perform the operations associated with the security-aware flow sharing analysis platform 302, although alternative, additional, or combined components may perform the operations in other instances or implementations.

The process analyzer 308 can automatically perform operations associated with analyzing, modifying, and annotating one or more integration scenarios 324, as well as any suitable preprocessing operations. The process analyzer 308, for example, may perform or be associated with operations 105, 110, 115, and 120 (including one or both of 125 and 130) of the process 100. The process analyzer 308 can identify one or more integration scenarios 324 and their respective integration flows and patterns, and can translate the raw data of those flows into a directed graph 328 as described in 110.

Further, the process analyzer 308 can include a shareability analysis module 312, where the shareability analysis module 312 can perform a determination to identify which portions of the integration scenarios 324 are shareable or are non-shareable. To do so, the shareability analysis module 312 can consider the directed graph 328 using one or more sharing rules 332 (stored in memory 322). The sharing rules 332 can include a list of white- or black-listed flows or patterns that can be used to determine whether a particular flow or pattern is shareable, not-shareable, or possibly shareable. For flows or patterns that are possibly shareable, additional algorithms including one or more pattern analyses 336 can be provided to further investigate and consider whether a particular pattern is shareable or not. An example of such an algorithm is illustrated for patterns of the type scripts in FIG. 7, and is described below. The output of the shareability analysis module 312 is a determination of whether a particular flow or pattern is shareable. The shareability analysis module 312 or another suitable component can then annotate the directed graph 328 to include the indications of shareability or non-shareability onto the particular corresponding graph entities.

As illustrated, the process analyzer 308 further includes a preprocessing module 314, where the preprocessing module 314 can perform operations related to graph partitioning and graph binning as described above.

The optimization manager 316 performs operations associated with the optimization of a solution of the security-aware flow sharing analysis. The optimization manager 316 can consider various optimization constraints 338 and container variants 346 to determine one or more potential flow assignments to various containers. The optimization manager 316 can consider process-based metrics 340, configuration-based metrics 342, and cost-based metrics 344 to determine the suitable optimizations, as well as information about the available container variants 346. The process-based metrics 340 can include such things as memory consumption, CPUs, processed messages, while the configuration-based metrics 342 can include such considerations as tenant-specific requirements (e.g., only use a particular set of cloud vendors, particular isolation constraints identified by the tenant, etc.) and platform configurations. Further, the cost-based metrics 344 can include information on container or virtual machine costs for various offerings, different costs associated with different vendors (e.g., cloud processing systems 380), and other cost-based analyses, including costs as considered based on performance and latency costs associated with modifying particular processes and adding communications between separated flows and processes. The container variants 346 may identify the particular specifications 348 of possible variants, as well as the costs 350 associated with that variant. The specifications 348 may identify particular configuration details of the variants, such as size, capabilities, and other information which may be considered by the optimization manager 316. The costs 350 can be considered along with any other cost-based metrics 344 in the analysis. In the end, the optimization manager 316 can provide an optimized and/or improved set of flow container assignments based on the analysis of the shareable and non-shareable processes and flows, and the costs associated with various responses to those determinations.

Once the optimization manager 316 provides the optimized analysis, the analysis is provided to the flow container assignment module 320, which can then perform the flow container assignments as needed, including by providing particular flows and/or processes to particular cloud processing systems 380, where the cloud processing systems 380 represent one or more cloud processors capable of executing the flows and processes of the integration scenarios 324 as optimized by the security-aware flow sharing analysis platform 302. The cloud processing systems 380 may represent any suitable cloud processor, including Amazon, Microsoft, SAP, and other cloud processing systems.

Memory 322 may represent a single memory or multiple memories. The memory 322 may include any memory or database module and may take the form of volatile or non-volatile memory including, without limitation, magnetic media, optical media, random access memory (RAM), read-only memory (ROM), removable media, or any other suitable local or remote memory component. The memory 322 may store various objects or data (e.g., integration scenarios 324, the directed graph 328, sharing rules 322, optimization constraints 338, and container variants 346, etc.), including financial data, user information, administrative settings, password information, caches, applications, backup data, repositories storing business and/or dynamic information, and any other appropriate information associated with the security-aware flow sharing analysis platform 302, including any parameters, variables, algorithms, instructions, rules, constraints, or references thereto. Additionally, the memory 322 may store any other appropriate data, such as VPN applications, firmware logs and policies, firewall policies, a security or access log, print or other reporting files, as well as others. While illustrated within the security-aware flow sharing analysis platform 302, memory 322 or any portion thereof, including some or all of the particular illustrated components, may be located remote from the security-aware flow sharing analysis platform 302 in some instances, including as a cloud application or repository, or as a separate cloud application or repository when the security-aware flow sharing analysis platform 302 itself is a cloud-based system.

As illustrated, one or more clients 370 may be present in the example system 300. Each client 370 may be associated with requests transmitted to the security-aware flow sharing analysis platform 302. In some instances, one or more of the clients 370 may be associated with particular customers or tenants executing or designing one or more integration scenarios 324. In other instances, one or more clients 370 may be associated with the generation, customization, or modification to one or more of the integration scenarios 324, or to one or more of the sharing rules 332, optimization constraints 338, or other aspects related to the security-aware flow sharing analysis platform 302. As illustrated, the client 370 may include an interface 372 for communication (similar to or different from interface 304), at least one processor 374 (similar to or different from processor 306), a client application 376, a graphical user interface (GUI) 380, and a memory 382 (similar to or different from memory 322).

The illustrated client 370 is intended to encompass any computing device such as a desktop computer, laptop/notebook computer, mobile device, smartphone, personal data assistant (PDA), tablet computing device, one or more processors within these devices, or any other suitable processing device. In general, the client 370 and its components may be adapted to execute any operating system, including Linux, UNIX, Windows, Mac OS®, Java™, Android™, or iOS. In some instances, the client 370 may comprise a computer that includes an input device, such as a keypad, touch screen, or other device(s) that can interact with the client application 376, and an output device that conveys information associated with the operation of the applications and their application windows to the user of the client 370. Such information may include digital data, visual information, or a GUI 380, as shown with respect to the client 370. Specifically, the client 370 may be any computing device operable to communicate queries or communications to the platform 302, other clients 370, and/or other components via network 360, as well as with the network 360 itself, using a wireline or wireless connection. In general, client 370 comprises an electronic computer device operable to receive, transmit, process, and store any appropriate data associated with the environment 300 of FIG. 3.

Client application 376 may be any suitable application, program, mobile app, or other component. As illustrated, the client application 376 interacts with the platform 302 via network 360. In some instances, the client application 376 may be a browser, where the functionality of the client application 376 may be realized using a web application or website the user can interact with via the client application 376. In other instances, the client application 376 may be a remote agent, component, or client-side version of the platform 302 or another component. In some instances, the client application 376 may interact directly with the security-aware flow sharing analysis platform 302.

GUI 380 of the client 370 interfaces with at least a portion of the environment 300 for any suitable purpose, including generating a visual representation of the client application 376 and/or the content associated with any components of the platform 302. In particular, the GUI 380 may be used to present results of a sharing analysis or optimization from the platform 302, update or interact with one or more sharing rules 332 or optimization constraints 338, or to otherwise interact and present information associated with one or more applications. GUI 380 may also be used to view and interact with various Web pages, applications, and Web services located local or external to the client 370. Generally, the GUI 380 provides the user with an efficient and user-friendly presentation of data provided by or communicated within the system. The GUI 380 may comprise a plurality of customizable frames or views having interactive fields, pull-down lists, and buttons operated by the user. In general, the GUI 380 is often configurable, supports a combination of tables and graphs (bar, line, pie, status dials, etc.), and is able to build real-time portals, application windows, and presentations. Therefore, the GUI 380 contemplates any suitable graphical user interface, such as a combination of a generic web browser, a web-enable application, intelligent engine, and command line interface (CLI) that processes information in the platform and efficiently presents the results to the user visually.

While portions of the elements illustrated in FIG. 3 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 4:
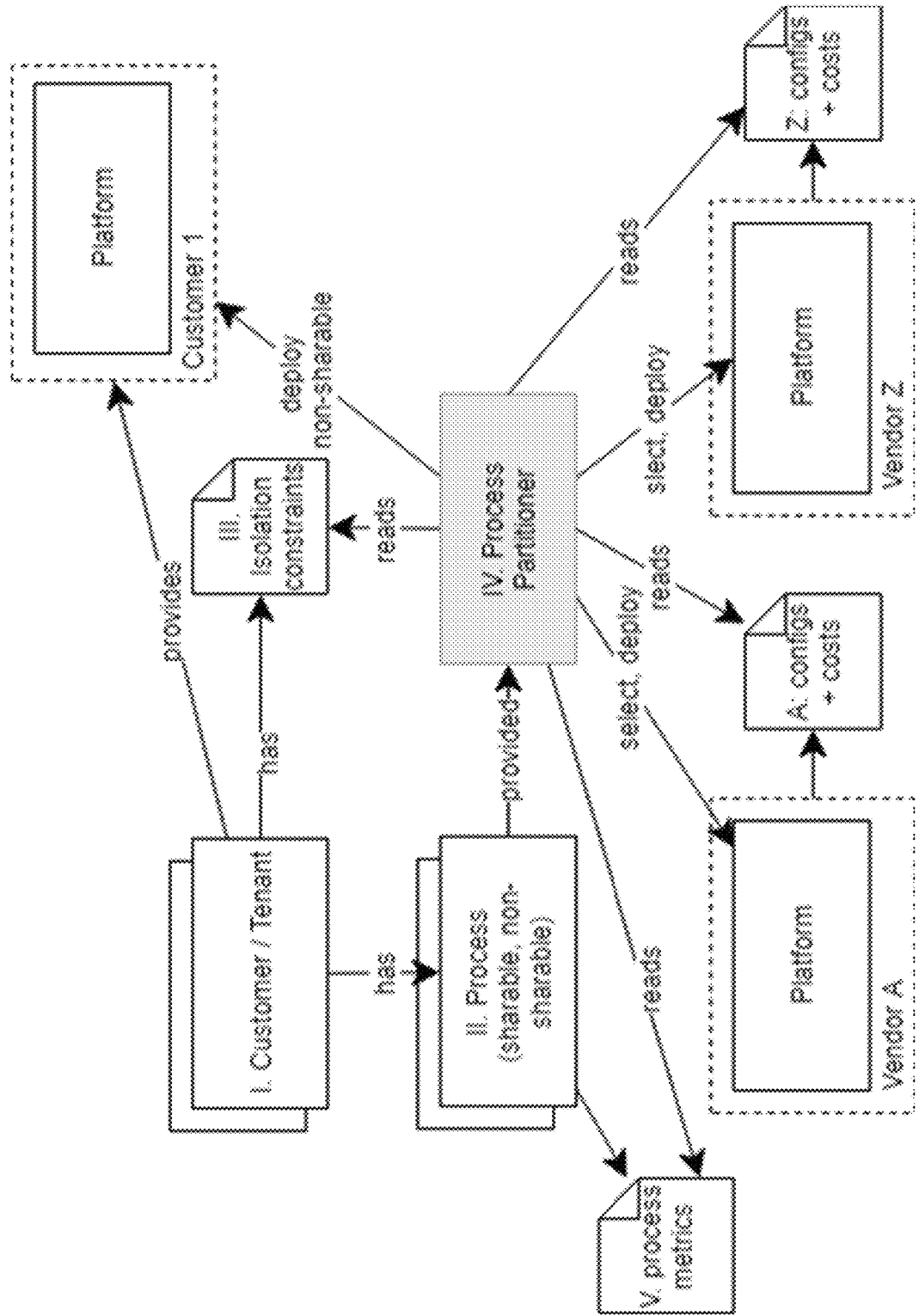
FIG. 4 illustrates an example component model associated with an example security-aware flow sharing analysis platform and the related components.

FIG. 4 illustrates an example component model associated with an example security-aware flow sharing analysis platform and the related components. It is assumed that (I) a tenant, or customer, has several (II) processes (e.g., some shareable and some non-shareable processes), as well as one or more (III) implicit isolation constraints (e.g., a constraint indicating that tenant isolation is required). A (IV) process partitioner uses the provided processes, as well as their (V) process metrics (e.g., memory consumption, CPU, number of processed messages, etc.), the tenants' isolation constraints, and the various platform configurations including their costs (e.g., container or VM costs for small to high end offerings, discounts based on volume, etc.), which denote or identify the cost models for the different vendor platforms (typically with different sizes and costs for the processing units). The process partitioner uses this information to calculate the optimal partitioning. In some instances, tenants can provide access to their own processing platforms to deploy non-shareable or highly security relevant sub-processes. In some instances, our mechanism those sub-processes are then pinned to the customer or tenant platform in the pre-processing step and are not analyzed further. Further, based on the optimization determinations, the partitioned portions of the processes can be deployed to different platforms for execution.

Figure 5:
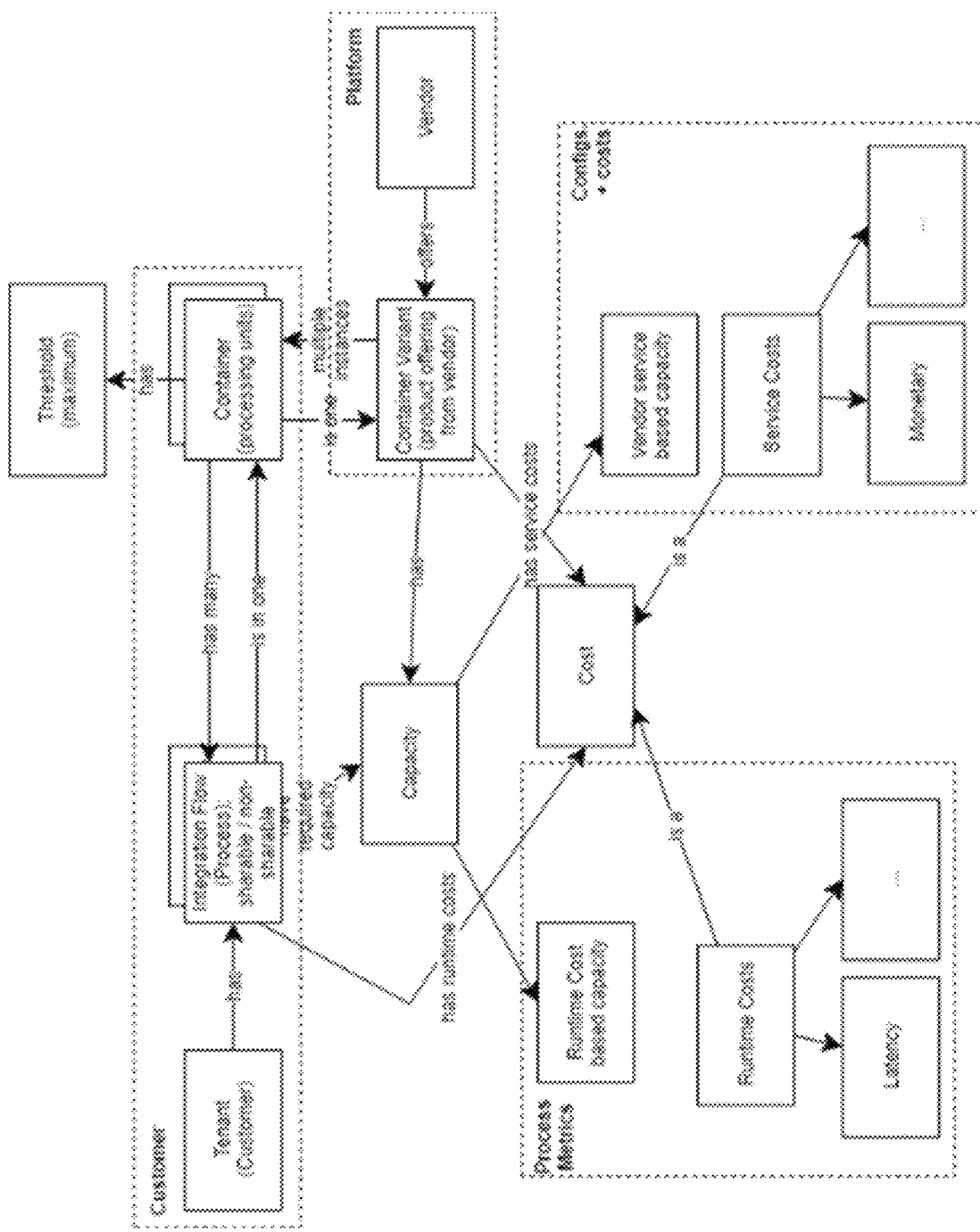
FIG. 5 illustrates an example optimization model used to perform the optimization processes for a flow sharing analysis.

FIG. 5 illustrates an example optimization model used to perform the optimization processes on the present solution. The illustrated optimization model of FIG. 5 includes a vendor offering multiple container variants, each with different configurations and costs (i.e., service costs) that must be paid by a consumer of the service when using a particular container variant. Each of the services has a capacity (e.g., CPU, network, memory, disk, etc.) that are guaranteed. The container variants can be instantiated as containers, or more generically, processing units.

A customer or tenant develops integration flows or processes, where each flow or process is combined into an integration scenario. From an analysis of the integration scenario, each of the flows or processes can be determined to be shareable or non-shareable. Each of these processes may be associated with a required capacity (e.g., CPU, network, memory, disk, etc.) and costs in terms of runtime costs, such as processing or network latency, message throughput, and other costs.

The processes can be executed on the instantiated container variants, called containers. Each container has thresholds representing its maximal capacity relevant for an assignment process. In the illustrated solution, the assignment is done by the process partitioner, which considers the metrics identified in the optimization model. The cost model allows for the following optimization goals, among others:

Maximizing cost savings for cloud process content provider;

Sharing processes per container variant and vendor (e.g., in a multi-cloud or inter-cloud solution);

Securely separating non-shareable processes via containers;

Determining different levels of shareability of the processes;

Minimizing latency for non-shareable processes (e.g., by causing those processes to have stickiness by using a preferred container variant vendor);

Separating customer processes (tenant separation); and

Limiting container variants to a particular list of vendors (e.g. for EUDP, customer preferences, etc.).

Using these considerations, an optimizer or optimization manager can return an answer or a set of potential answers for how to split and/or separate particular components. The results of the analysis can then be used to determine how the flows are to be distributed.

Figure 6:
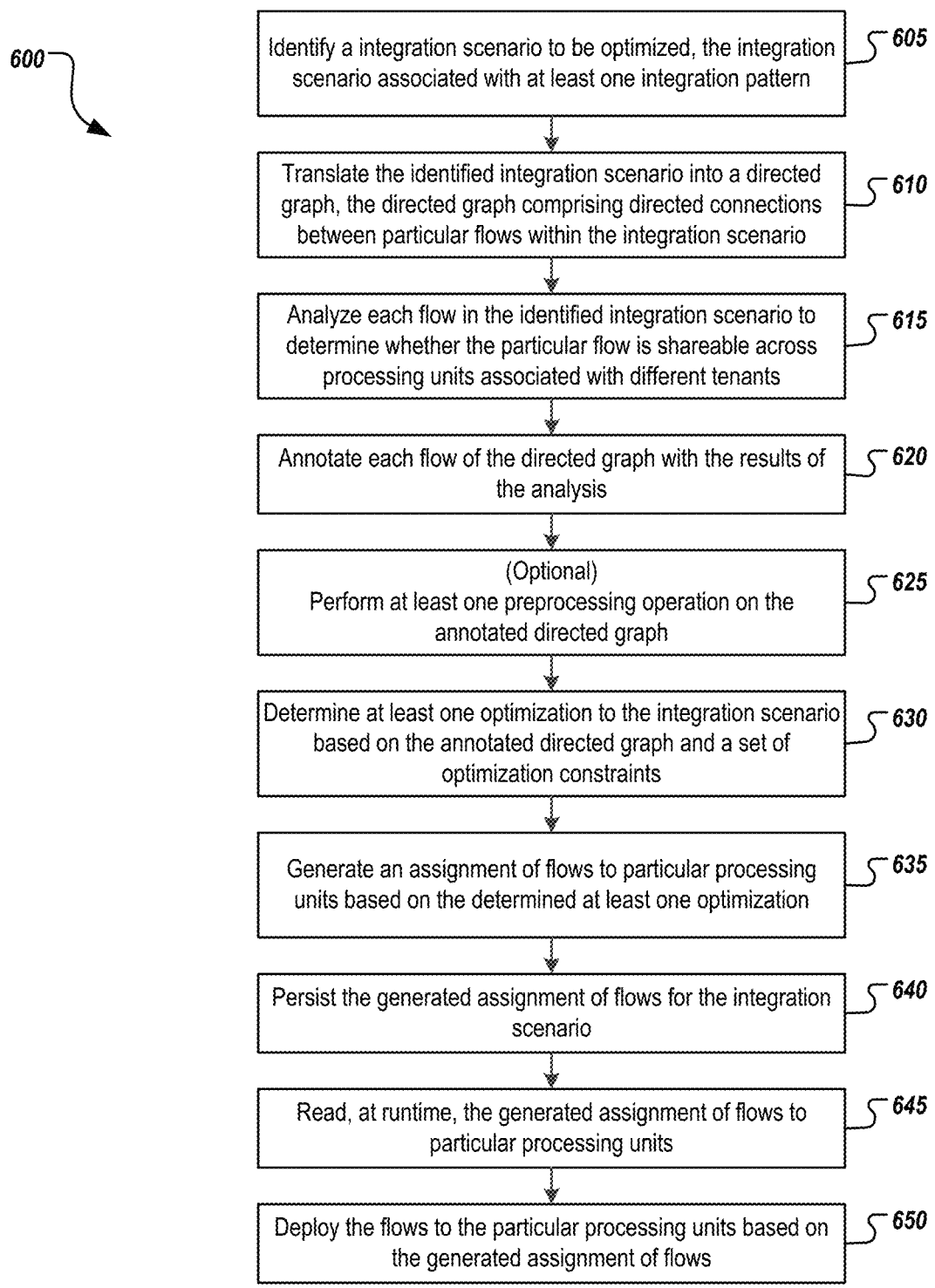
FIG. 6 represents an example flow for performing a security-aware flow sharing process in one example implementation.

FIG. 6 represents an example flow for performing a security-aware flow sharing process in one example implementation. For clarity of presentation, the description that follows generally describes method 600 in the context of the system 300 illustrated in FIG. 3. However, it will be understood that method 300 may be performed, for example, by any other suitable system, environment, software, and hardware, or a combination of systems, environments, software, and hardware as appropriate. In some instances, method 300 can be performed by the security-aware flow sharing analysis platform 302, or portions thereof, described in FIG. 3, as well as other components or functionality described in other portions of this description.

At 605, an integration scenario is identified to be optimized, where the integration scenario is associated with at least one integration pattern. The at least one integration pattern may include one or more integration flows or processes, where those flows or processes represent actions performed within an integration scenario. The identified integration scenario can be associated with or included in a cloud-based system, and can be identified for analysis and relative optimization based on one or more optimization constraints. The one or more optimization constraints can include one or more of the following: process-based metrics, configuration-based metrics, and cost-based metrics. Additional optimization constraints can be identified and used in the optimization operations. In some instances, the integration scenario can be represented a business process modeling notation (BPMN).

At 610, the identified integration scenario is translated into a directed graph for further processing. The direct graph can include or comprise directed connections between particular flows or processes within the integration scenario.

At 615, each flow in the identified integration scenario can be automatically analyzed to determine whether the particular flow is shareable across processing units associated with one or more different tenants or other customers in a multi-tenant system. The processing units used to execute the flows or processes can include at least one of a virtual machine (VM) or a container including within one or more VMs.

Figure 7:
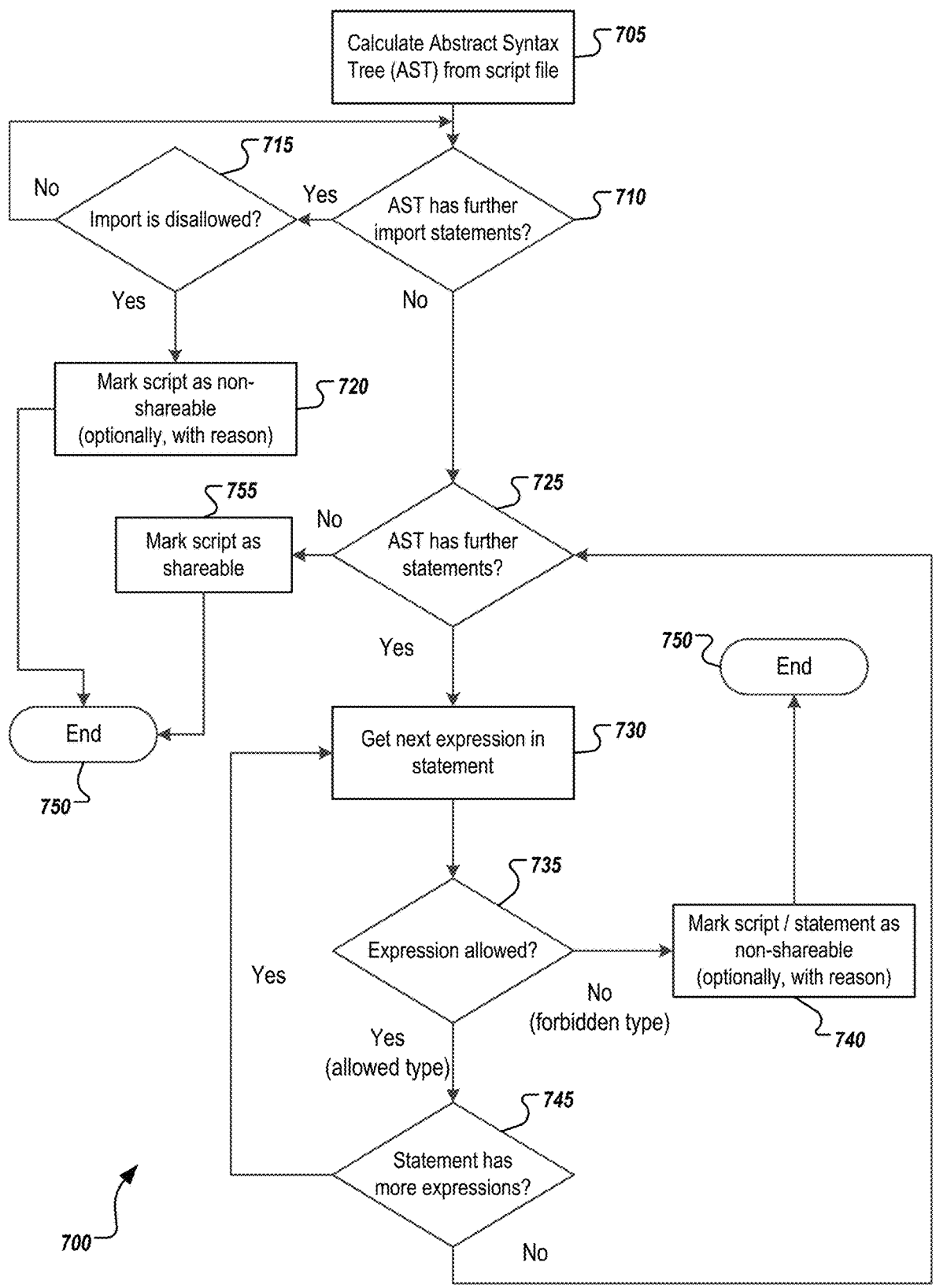
FIG. 7 represents an example flow related to a sharing analysis specific to a particular script file in an example implementation.

In some instances, the analysis as to whether the particular flow is shareable can be based on an integration pattern type-based analysis. In one implementation, a particular integration pattern type of a particular flow or process is identified. Example integration pattern types include, for example, message end events (i.e., sending integration adapters), content enrichers, message start events (i.e., receiving integration adapters), message mappings, user-defined functions (e.g., scripts), request-replies, end point senders (e.g., applications, devices), content-based routers, and custom adapters, among others. Based on the particular integration pattern type, an integration pattern type-specific analysis can be performed on the particular flow or process, where the analysis determines whether the particular flow or process is shareable across processing units. In some instances, the integration pattern type-analysis may be based on a predetermined identification of pattern types that are shareable, non-shareable, or possibly shareable. In those instances, if the pattern type is determined to be shareable, that pattern type may be determined to be shareable based on its prior identification as a shareable pattern type. Similarly, if the pattern type is determined to be non-shareable, then that pattern type is determined to be not shareable. If the pattern type is possibly shareable, a pattern type-specific algorithm can be performed to determine if the contents of the pattern allow the specific flow or process to be shared without potential harm. An example set of operations for a script are illustrated in FIG. 7, and are described below.

At 620, each flow or process included in the directed graph can be annotated with the results of the sharing analysis. In some instances, the annotations can be made within the directed graph itself, or they can be made as associated metadata stored apart from the directed graph.

At 625, in some instances, at least one preprocessing operation can be performed on the annotated directed graph. The at least one preprocessing operations can include a graph partitioning operation and a graph bin packing operation (e.g., for bounds computations), among others. These operations have been described above. The graph partitioning operations can be performed in response to a determination that a particular flow includes a sequence of operations to be performed. If a determination is made that at least a first portion of the sequence of operations to be performed are annotated or associated with a non-shareable portion and at least a second portion of the sequence is annotated or associated with a shareable portion of the sequence of operations, then a graph partitioning operation can be performed on the flow or process to split the directed graph into a shareable portion and a non-shareable portion. The partitioned portions can represent modified processes or flows, including an insertion of a call from the shareable portion of the process to the non-shareable portion of the process. Further, a call from the non-shareable portion to the shareable portion can be included. The particular portions can, at runtime, be separated into separate containers, where the shareable portions can be included with operations and flows associated with other tenants or customers, while the non-shareable portions are kept separate and secure from other tenant's flows.

At 630, at least one optimization to the integration scenario is determined based on the annotated directed graph and the set of optimization constraints. Determining the at least one optimization can include comparing execution parameters associated with the expected execution of the graph partitioned shareable and non-shareable portions of the particular flow to an expected execution of the particular flow. In response to determining from the comparison that the expected execution of the graph partitioned shareable and non-shareable portions of the particular flow improve performance according to the at least one optimization constraints, it can be determined to use the graph partitioned shareable and non-shareable portions for the particular flow. In some instances, two or more potential solutions and/or optimizations may be identified. The optimization determination of 630 can be used to identify a better or more efficient one of the possible optimizations, as well as whether the optimizations satisfy the various requirements of the optimization constraints, as well as whether the optimizations improve performance and parameters of execution associated with the integration scenario. If additional latency is added due to a possible solution, for example, the solution may not represent a suitable optimization and can be ignored.

At 635, based on the determined at least one optimization, an assignment of flows can be generated that identifies assignments of particular flows or processes to particular containers or other processing units. In some instances, a general and not specific identification of the particular type of containers or processing units to be used are identified by the identified assignment. At 640, the generated assignment of flows can be persisted for use at runtime. In other instances, the assignment of flows may be a runtime determination. In some instances, the shareable flows and processes may be associated with an external cloud-based processing system, while in some instances, non-shareable flows and processes may be associated, where available, an internal system for processing, in an effort to provide further protection to the non-shareable processes and related data.

At 645, at runtime, the generated assignment of flows to particular processing units can be read and determined. Using that information, the runtime system can deploy the flows to particular processing units.

FIG. 7 represents an example flow related to a sharing analysis specific to script pattern types in an example implementation. Alternative determinations and considerations can be used in various instances, and other possibly shareable pattern types can include their own specific algorithm and analysis.

At 705, an abstract syntax tree (AST) can be calculated or otherwise generated from the script file.

At 710, a determination is made as to whether the AST has further import statements. The determination may be whether the AST has a first import statement, or whether the AST has additional import statements after at least one prior import statement was identified. If so, method 700 continues at 715, where a determination is made as to whether the import is disallowed. If the import is disallowed (for any of the import statements), then method 700 continues at 720, where the script is identified and annotated as non-shareable. In some instances, a reason for the non-shareability of the script can be included in the annotation. Once determined to be non-shareable, method 700 can end at 750. Returning to 715, if the import is not disallowed, then method 700 can return to 710 to determine if additional import statements exist. Returning to 710, if no further import statements exist, then method 700 continues to 725.

At 725, a determination is made as to whether the AST includes further statements. If so, method 700 continues to 730, where a next expression in the statement is obtained. At 735, a determination is made as to whether the current expression is allowed to be shared. If the determination identifies the current expression as a forbidden type, method 700 continues to 740, where the script (and/or the statement) is marked as non-shareable. At that point, method 700 continues to 750, where it ends. If, at 735, the current expression is determined to be allowed, then a determination is made at 745 as to whether the statement include more expressions. If so, method 700 returns to 730 and performs a similar analysis. If not, method 700 returns to 725, where a determination is made as to whether the AST has further statements. If so, the method 700 returns to 730 and performs the analysis on the expressions on the next statement. If, however, the AST does not include further statements, then method 700 continues to 755, where the script is marked or annotated as shareable, and method 700 can end.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate. For example, flows where latency is crucial, the optional graph partitioning may not be executed. Other suitable variations may be included in any implementations.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
   identifying an integration scenario, wherein the integration scenario is modeled using at least one integration flow, and wherein the integration scenario is identified to be optimized in a cloud-based system based on one or more optimization constraints;
   translating the identified integration scenario into a directed graph, the directed graph comprising connections between particular flows within the integration scenario;
   automatically determining, for each flow in the directed graph, whether the particular flow is shareable across processing units associated with a different tenant;
   annotating each flow of the directed graph with results of whether the particular flow is shareable;
   determining at least one optimization to the integration scenario based on the annotated directed graph and a set of optimization constraints; and
   generating an assignment of flows to particular processing units based on the determined at least one optimization.

2. The method of claim 1, further comprising, at runtime:
   reading the generated assignment of flows to particular processing units; and
   deploying the flows to particular processing units based on the generated assignment of flows.

3. The method of claim 1, wherein the optimization constraints include at least one of a process-based metric, a configuration-based metric, or a cost-based metric.

4. The method of claim 1, wherein the processing units comprise at least one of virtual machines (VMs) or containers included within one or more VMs.

5. The method of claim 1, wherein determining the at least one optimization to the integration scenario comprises:
   determining that a particular flow includes a sequence of operations to be performed;
   determining that at least a first portion of the sequence of operations to be performed comprises a non-shareable portion of the sequence of operations and at least a second portion of the sequence of operations to be performed comprises a shareable portion of the sequence of operations; and
   performing a graph partitioning operation on the particular flow to split the directed graph associated with the particular flow into a shareable portion and a non-shareable portion based on the determination, including inserting a call from the shareable portion to the non-shareable portion and a call from the non-shareable portion to the shareable portion for execution at runtime.

6. The method of claim 5, wherein, after performing the graph partitioning operation, and prior to generating the assignment of flows to particular processing units, determining the at least one optimization to the integration scenario further comprises:
   comparing execution parameters associated with the expected execution of the graph partitioned shareable and non-shareable portions of the particular flow to an expected execution of the particular flow; and
   determining to use the graph partitioned shareable and non-shareable portions for the particular flow in response to determining from the comparison that the expected execution of the graph partitioned shareable and non-shareable portions of the particular flow improve performance according to the one or more optimization constraints.

7. The method of claim 1, wherein automatically determining, for each flow in the directed graph, whether the particular flow is shareable across processing units associated with a different tenant comprises:
   identifying an integration pattern type associated with the particular flow;
   performing an integration pattern type-specific analysis on the particular flow; and
   determining whether the particular flow is shareable across processing units associated with a different tenant based on the integration pattern type-specific analysis.

8. The method of claim 7, wherein the integration pattern type-specific analysis on the particular flow comprises a white-list based analysis of particular integration pattern types.

9. A system comprising:
   at least one processor; and
   a memory communicatively coupled to the at least one processor, the memory storing instructions which, when executed, cause the at least one processor to perform operations comprising:
   identifying an integration scenario, wherein the integration scenario is modeled using at least one integration flow, and wherein the integration scenario is identified to be optimized in a cloud-based system based on one or more optimization constraints;

translating the identified integration scenario into a directed graph, the directed graph comprising connections between particular flows within the integration scenario;

automatically determining, for each flow in the directed graph, whether the particular flow is shareable across processing units associated with a different tenant;

annotating each flow of the directed graph with results of whether the particular flow is shareable;

determining at least one optimization to the integration scenario based on the annotated directed graph and a set of optimization constraints; and generating an assignment of flows to particular processing units based on the determined at least one optimization.

10. The system of claim 9, the operations further comprising, at runtime:

reading the generated assignment of flows to particular processing units; and deploying the flows to particular processing units based on the generated assignment of flows.

11. The system of claim 9, wherein the optimization constraints include at least one of a process-based metric, a configuration-based metric, or a cost-based metric.

12. The system of claim 9, wherein the processing units comprise at least one of virtual machines (VMs) or containers included within one or more VMs.

13. The system of claim 9, wherein determining the at least one optimization to the integration scenario comprises:

determining that a particular flow includes a sequence of operations to be performed;

determining that at least a first portion of the sequence of operations to be performed comprises a non-shareable portion of the sequence of operations and at least a second portion of the sequence of operations to be performed comprises a shareable portion of the sequence of operations; and performing a graph partitioning operation on the particular flow to split the directed graph associated with the particular flow into a shareable portion and a non-shareable portion based on the determination, including inserting a call from the shareable portion to the non-shareable portion and a call from the non-shareable portion to the shareable portion for execution at runtime.

14. The system of claim 13, wherein, after performing the graph partitioning operation, and prior to generating the assignment of flows to particular processing units, determining the at least one optimization to the integration scenario further comprises:

comparing execution parameters associated with the expected execution of the graph partitioned shareable and non-shareable portions of the particular flow to an expected execution of the particular flow; and determining to use the graph partitioned shareable and non-shareable portions for the particular flow in response to determining from the comparison that the expected execution of the graph partitioned shareable and non-shareable portions of the particular flow improve performance according to the one or more optimization constraints.

15. The system of claim 9, wherein automatically determining, for each flow in the directed graph, whether the particular flow is shareable across processing units associated with a different tenant comprises:

identifying an integration pattern type associated with the particular flow;

performing an integration pattern type-specific analysis on the particular flow; and determining whether the particular flow is shareable across processing units associated with a different tenant based on the integration pattern type-specific analysis.

16. The system of claim 15, wherein the integration pattern type-specific analysis on the particular flow comprises a white-list based analysis of particular integration pattern types.

17. A non-transitory computer-readable medium storing instructions which, when executed, cause at least one processor to perform operations comprising:

identifying an integration scenario, wherein the integration scenario is modeled using at least one integration flow, and wherein the integration scenario is identified to be optimized in a cloud-based system based on one or more optimization constraints;

translating the identified integration scenario into a directed graph, the directed graph comprising connections between particular flows within the integration scenario;

automatically determining, for each flow in the directed graph, whether the particular flow is shareable across processing units associated with a different tenant;

annotating each flow of the directed graph with results of whether the particular flow is shareable;

determining at least one optimization to the integration scenario based on the annotated directed graph and a set of optimization constraints; and generating an assignment of flows to particular processing units based on the determined at least one optimization.

18. The non-transitory computer-readable medium of claim 17, the operations further comprising, at runtime:

reading the generated assignment of flows to particular processing units; and deploying the flows to particular processing units based on the generated assignment of flows.

19. The non-transitory computer-readable medium of claim 17, wherein the optimization constraints include at least one of a process-based metric, a configuration-based metric, or a cost-based metric.

20. The non-transitory computer-readable medium of claim 17, wherein determining the at least one optimization to the integration scenario comprises:

determining that a particular flow includes a sequence of operations to be performed;

determining that at least a first portion of the sequence of operations to be performed comprises a non-shareable portion of the sequence of operations and at least a second portion of the sequence of operations to be performed comprises a shareable portion of the sequence of operations; and performing a graph partitioning operation on the particular flow to split the directed graph associated with the particular flow into a shareable portion and a non-shareable portion based on the determination, including inserting a call from the shareable portion to the non-shareable portion and a call from the non-shareable portion to the shareable portion for execution at runtime.

* * * * *